(12) United States Patent
Awa et al.

(10) Patent No.: US 7,732,518 B2
(45) Date of Patent: Jun. 8, 2010

(54) METHOD FOR PRODUCING POLYOLEFIN COMPOSITION

(75) Inventors: Hideaki Awa, Ibaraki (JP); Hajime Shinomiya, Oita (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/107,896

(22) Filed: Apr. 23, 2008

(65) Prior Publication Data

US 2008/0269391 A1     Oct. 30, 2008

(30) Foreign Application Priority Data

Apr. 27, 2007   (JP) .............................. 2007-118641

(51) Int. Cl.
*C08K 5/04*   (2006.01)
(52) U.S. Cl. ...................... 524/394; 524/400
(58) Field of Classification Search ............... 524/394
See application file for complete search history.

(56) References Cited

U.S. PATENT DOCUMENTS 5,597,857 A * 1/1997 Thibaut et al. .............. 524/400

* cited by examiner

*Primary Examiner*—Ling-Siu Choi
*Assistant Examiner*—Hui Chin
(74) *Attorney, Agent, or Firm*—Sughrue Mion, PLLC

(57) ABSTRACT

A method for producing a polyolefin composition, which comprises melt-kneading a particulate composition (A) containing a compound represented by formula (1):

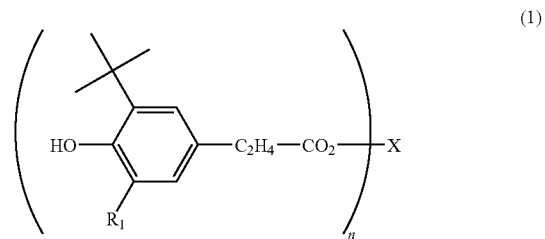

(1)

wherein $R_1$ represents an alkyl group having 1 to 8 carbon atoms, X represents an n-hydric alcohol residue having 1 to 18 carbon atoms which may include a heteroatom and/or a cyclic group, and n is the integer 2 or 4, and a metal soap, and a particulate polyolefin (B), wherein the ratio (a/b) of the average particle diameter (a) of the particulate composition (A) and the an average particle diameter (b) of the particulate polyolefin (B) is adjusted to 3/1 to 1/3, and wherein average particle diameter means the central cumulative value determined from a weight-based particle diameter cumulative distribution for residue on a sieve measured in accordance with JIS K 0069.

6 Claims, No Drawings

METHOD FOR PRODUCING POLYOLEFIN COMPOSITION

BACKGROUND OF THE INVENTION

1. Field of the Invention

The present invention relates to a method for producing a polyolefin composition containing an additive or additives.

2. Description of the Related Art

In order to prevent thermal degradation and oxidation degradation in a polyolefin, additives such as a phenol-based antioxidant and/or calcium stearate are added thereto and then a polyolefin is used in the form of a polyolefin composition.

Generally, when a powdery additive is added to a polyolefin, there are problems with dusting and dust explosibility of the additive. As a method to solve these problems, Japanese Unexamined Patent Publication (Kokai) No. 8-333477 (Example 2 in paragraph [0142] and Table 2 in paragraph [0144]) proposes adding a particulate additive composition (granules) to a polyolefin. Specifically, a particulate additive composition having a maximum length of 2 to 4.5 mm formed by heating a mixture of a phenol-based antioxidant and calcium stearate in a twin screw extruder to 205° C. and then extruding the mixture from holes having a diameter of 2 mm is disclosed.

A particulate polyolefin having a size of 250 μm or less before addition of an additive is disclosed in Japanese Unexamined Patent Publication (Kokai) No. 10-53679 (Table 1 in paragraph [0021]). Also, a polyolefin having a weight average particle diameter of 390 to 610 μm before addition of an additive is specifically disclosed in the Examples in Japanese Unexamined Patent Publication (Kokai) No. 2000-143706 (Examples).

There is nothing specifically disclosed in Japanese Unexamined Patent Publication (Kokai) No. 8-333477 about adding a particulate composition (A) containing an additive or additives to a particulate polyolefin (B). Hypothetically, when the particle diameter (a) of the particulate composition (A) is 2 mm and the particle diameter (b) of the particulate polyolefin (B) is 250 μm, there is added at a particle diameter ratio (a/b) of about 8, and when the particle diameter (a) of the particulate composition (A) is 2 mm and the particle diameter (b) of the particulate polyolefin (B) is 610 μm, there is added at a particle diameter ratio (a/b) of about 3.1.

The present inventors, upon examination of a polyolefin composition obtained by adding a particulate polyolefin (B) having an average particle diameter so that the particle diameter ratio (a/b) is 5.2 to a particulate composition (A) containing a compound represented by formula (1), which is one type of phenol-based antioxidant, and calcium stearate, found the problems of large variation in MFR and of insufficient dispersion of the additive in the polyolefin.

(1)

wherein $R_1$ represents an alkyl group having 1 to 8 carbon atoms, X represents an n-hydric alcohol residue having 1 to 18 carbon atoms which may include a heteroatom and/or a cyclic group, and n is the integer 2 or 4.

SUMMARY OF THE INVENTION

An object of the present invention is to provide a method for producing a polyolefin composition in which a particulate composition containing the compound (1) and a metal soap such as calcium stearate is sufficiently dispersed.

The present invention is a method for producing a polyolefin composition, which comprises melt-kneading a particulate composition (A) containing a compound represented by formula (1):

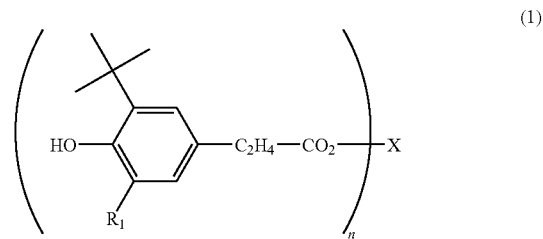

wherein $R_1$ represents an alkyl group having 1 to 8 carbon atoms, X represents an n-hydric alcohol residue having 1 to 18 carbon atoms which may include a heteroatom and/or a cyclic group, and n is the integer 2 or 4 and a metal soap, and a particulate polyolefin (B), wherein the ratio (a/b) of the average particle diameter (a) of the particulate composition (A) and the an average particle diameter (b) of the particulate polyolefin (B) is adjusted to 3/1 to 1/3, and wherein average particle diameter means the central cumulative value determined from a weight-based particle diameter cumulative distribution for residue on a sieve measured in accordance with JIS K 0069.

According to the present invention, a polyolefin composition can be obtained in which the compound (1) and the metal soap are sufficiently dispersed. Also, since the additive is sufficiently dispersed in the polyolefin composition, storage stability is excellent, the MFR of the polyolefin composition is nearly constant, and a good product can be formed.

DETAILED DESCRIPTION OF THE INVENTION

The present invention will be described in detail below.

The compound used in the present invention is a compound represented by formula (1).

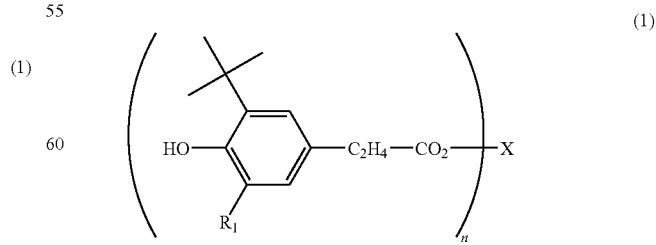

$R_1$ in compound (1) represents a linear or branched alkyl group having 1 to 8 carbon atoms such as a methyl group, a t-butyl group, a t-pentyl group, or a t-octyl group. Among these, a methyl group or a t-butyl group is preferable.

n is 2 or 4.

X is an n-hydric alcohol residue and the number of carbons included in X is from 1 to 18. Here, an alcohol residue referred thereto means a group in which the hydrogen atom of the hydroxyl group has been removed from an alcohol.

Also, X may include a heteroatom such as an oxygen atom, a sulfur atom, or a nitrogen atom and/or may include a cyclic group such as an alicyclic group having a cyclopentane structure, a cyclohexane structure, or the like or an aromatic group having a benzene structure or the like. Naturally, the carbon atoms of the cyclic group may be substituted with heteroatoms.

If the alcohol residue is exemplified in the form of an alcohol, examples include stearyl alcohol, decyl alcohol, octyl alcohol, triethylene glycol, 3,9-bis(2-hydroxy-1,1-dimethylethyl)-2,4,8,10-tetraoxaspiro[5.5]undecane, pentaerythritol. Among these, stearyl alcohol, triethylene glycol, 3,9-bis(2-hydroxy-1,1-dimethylethyl)-2,4,8,10-tetraoxaspiro[5.5]undecane, and pentaerythritol are preferable.

The melting point of the compound (1) is usually around 70 to 220° C., preferably 70 to 150° C., and more preferably 100 to 130° C.

It is preferable when the melting point of the compound (1) is 220° C. or lower since there is a tendency that dispersity in a plastic is improved. It is preferable when the melting point is 70° C. or higher since there is a tendency that mutual adhesion at storage under a high temperature is suppressed.

Examples of the compound (1) include 3,9-bis[2-{3-(3-t-butyl-4-hydroxy-5-methylphenyl)propionyloxy}-1,1-dimethylethyl]-2,4,8,10-tetraoxaspiro[5.5]undecane, bis{3-(3-t-butyl-4-hydroxy-5-methylphenyl)propionic acid}triethylene glycolyl ester, and tetrakis{3-(3,5-di-t-butyl-4-hydroxyphenyl)propionic acid}pentaerythrityl ester.

The weight-based average particle diameter of the compound (1) is usually around 1 to 100 μm, and preferably around 5 to 70 μm. When the average particle diameter of the compound (1) is 1 μm or more, there is a tendency that the production time is shortened and that the heating temperature is reduced. In contrast, when the average particle diameter of the compound (1) is 100 μm or less, a high flow index is exhibited in many cases, even when particles are not formed.

The flow index in the present invention is Carr's flow index, in which four types of values, namely, repose angle, compressibility, spatula angle, and degree of uniformity or degree of aggregation of a particulate additive composition are measured, each of these is scored using an index having a maximum of 25, which has been empirically obtained for many powders and particles, and the flow index is expressed by the total of these indices (maximum: 100, minimum: 0) [see "Terminology Dictionary For Powder Technology" edited by The Society of Powder Technology, Japan, 2nd edition, The Nikkan Kogyo Shinbun, Ltd., Mar. 30, 2000, pp. 56 and 57].

Average particle diameter in the present invention means the central cumulative value determined from a weight-based particle diameter cumulative distribution for residue on a sieve measured in accordance with JIS K 0069. In other words, the average particle diameter in the present invention is the particle diameter corresponding to 50% by weight of this cumulative distribution.

The metal soap used in the present invention is a $C_{10}$ to $C_{18}$ fatty acid alkali metal salt, alkaline earth metal salt, aluminum metal salt, iron metal salt, or zinc metal salt in which the hydroxyl group may be substituted.

As the fatty acid, stearic acid, palmitic acid, lauric acid, behenic acid, and 1,2-hydroxystearic acid can be given as examples.

As the alkali metal, lithium, potassium, and sodium can be given as examples. As the alkaline earth metal, magnesium, calcium, and barium can be given as examples.

Among these, as the metal soap, a commercially available calcium stearate (usually a mixture of calcium stearate and calcium palmitate) is preferable.

As the commercially available fatty acid calcium, AULABRITE® NC, Calcium Stearate S (manufactured by NOF Corporation), calcium stearate manufactured by Kyodo Chemical Co., Ltd., and calcium stearate manufactured by Shinagawa Chemical Industry Co., Ltd. (tradename: SAK) can be given as examples.

The particulate composition (A) used in the present invention is a composition containing the compound (1) and the metal soap. Usually, the total of the compound (1) and the metal soap based on 100 parts by weight of all the components comprised in the particulate composition (A) is 10 to 100 parts by weight, and preferably 10 to 80 parts by weight.

It is preferable when the total of the compound (1) and the metal soap are within the above-mentioned ranges since there is a tendency for the effects of the compound (1) and the metal soap to be exhibited even if the amount of the particulate composition (A) is small.

Although the particulate composition (A) may be formed into particles with only the compound (1) and fatty acid calcium if melt-kneaded at a temperature equal to or higher than the melting point of the compound (1), the particulate composition (A) is usually formed by mixing a binder.

As the binder, a sulfur-based compound represented by formula (2):

$$(R_2-Y-S-C_2H_4CO_2)_m-Z \qquad (2)$$

wherein $R_2$ represents an alkyl group having 12 to 18 carbon atoms, Y represents a single bond or a $-C_2H_4CO_2-$ group, Z represents an m-hydric alcohol residue having 5 to 18 carbon atoms, and m represents an integer from 1 to 4, a polyethylene wax with a low melting point, paraffin, a partial fatty acid ester of a polyhydric alcohol, or a fatty acid amide can be given as examples.

Here, in the sulfur-based compound (2), $R_2$ represents a linear or branched alkyl group having 12 to 18 carbon atoms, Y represents a single bond or a $-C_2H_4CO_2-$ group, m represents an integer from 1 to 4, and Z represents an m-hydric alcohol residue having 5 to 18 carbon atoms.

As $R_2$ in the sulfur-based compound (2), a dodecyl group, a tetradecyl group, an octadecyl group, or the like is preferable.

An alcohol residue referred thereto means the part other than the hydrogen atom of the hydroxyl group of an alcohol. If the preferred alcohol residue Z is exemplified in the form of an alcohol, examples include dodecyl alcohol, tetradecyl alcohol, octadecyl alcohol, and pentaerythritol. In particular, when Y is a single bond in the sulfur-based compound (2), a compound in which $R_2$ is a dodecyl group, m is 4, and Z is a pentaerythritol residue is preferred. Also, when Y is a $-C_2H_4CO_2-$ group, a compound in which $R_2$ is a dodecyl group, tetradecyl group, or an octadecyl group, m is 1, and Z is an alcohol residue having 12, 14 or 18 carbon atoms corresponding to the above-mentioned $R_2$ is preferred.

When Y is a $-C_2H_4CO_2-$ group, usually the alcohol residue and $R_2$ are bonded by an ester group to form, specifically, $-C_2H_4CO_2-R_2$.

The following compounds can be given as specific examples of the sulfur-based compound represented by formula (2):
3,3'-thiodipropionic acid di-n-dodecyl ester;
3,3'-thiodipropionic acid di-n-tetradecyl ester;
3,3'-thiodipropionic acid di-n-octadecyl ester;
tetrakis(3-dodecylthiopropionic acid)pentaerythrityl ester.

Among these, 3,3'-thiodipropionic acid di-n-dodecyl ester, 3,3'-thiodipropionic acid di-n-tetradecyl ester, or 3,3'-thiodipropionic acid di-n-octadecyl ester is preferable.

In the particulate composition (A), the content of the sulfur-based compound (2) based on a total of 100 parts by weight of the compound (1) and the sulfur-based compound (2) is 3 to 70 parts by weight, and preferably 8 to 35 parts by weight. It is preferable when the content of the sulfur-based compound (2) is 3 parts by weight or more, since there is a tendency of shortening in the time for producing granules, lowering of the heating temperature, and improvement in the flow index. It is also preferable when the content is 70 parts by weight or less since there is a tendency that production of coarse granules is suppressed. It is particularly preferable when the content is 35 parts by weight or less since there is a tendency that production of coarse granules is further suppressed and the size of the granules is easily controlled.

In the case where the particulate composition (A) contains an additive or additives described later, it is particularly preferable when 8 parts by weight or more of the sulfur-based compound (2) based on 100 parts by weight of the particulate composition (A) is mixed since the time for producing granules is shortened and the heating temperature is lowered.

Also, in the particulate composition (A), the content of the compound (1) based on a total of 100 parts by weight of the compound (1) and the sulfur-based compound (2) is usually 97 to 3 parts by weight.

In the particulate composition (A), it is not meant that the compound (1) and the sulfur-based contained (2) are contained in each granule in the above-mentioned weight ratio, but it is meant that the entire particulate composition (A) is formed such that it contains the compound (1) and the sulfur-based compound (2) at the above-mentioned weight ratio.

Also, the particulate composition (A) containing the sulfur-based compound (2) is a granule aggregate of an irregular shape described in JIS-Z 8841 (1993) p. 10, Explanation Table 1, Shape and Name of Granulated Material.

The particulate composition (A) may further contain at least one additive selected from the following additive group in such a range that the granulation property (granulation operability) is not influenced. Usually, the total content of the additives in the particulate composition (A) is around from 0 to 90% by weight. As the additive, an organic additive having a melting point of 70° C. or higher or an inorganic additive is preferable from the viewpoint of the granulation property.

The weight-based average particle diameter of an additive used in the present invention is preferably in the range from 0.1 to 100 μm, and particularly preferably in the range from 0.5 to 70 μm.

When a commercially available additive is used as it is, it is preferable that the additive is adjusted to a preferable weight-based average particle diameter by a known method in advance and used.

[Additive group: neutralizing agent, lubricant, phosphorus-based antioxidant, hindered amine-based light stabilizer, ultraviolet absorber, antistatic agent, antiblocking agent, pigment, flame-retardant, filler and phenol-based antioxidant other than the compound (1)]

The following compounds can be given as examples of the above-mentioned additives.

A neutralizer such as synthetic hydrotalcite, natural hydrotalcite, and calcium hydroxide; a lubricant such as oleic amide, erucylamide, and polyethylene wax;

a phosphorous-based antioxidant such as tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-dicumylphenyl) pentaerythritol diphosphite, tetrakis(2,4-di-t-butylphenyl)-4, 4'-biphenylene diphosphonite, and 6-[3-(3-t-butyl-4-hydroxy-5-methylphenyl)propoxy]-2,4,8,10-tetra-t-butyldibenz[d,f][1,3,2]dioxaphosphepine;

a hindered amine-based photostabilizer such as bis(2,2,6,6-tetramethyl-4-piperidyl)sevacate and poly[{6-(1,1,3,3-tetramethylbutyl)amino-1,3,5-triazin-2,4-diyl}{(2,2,6,6-tetramethyl-4-piperidyl)imino}1,6-hexamethylene{(2,2,6,6-tetramethyl-4-piperidyl)imino}];

an ultraviolet absorber such as 2-(2-hydroxy-5-methylphenyl)benzotriazole, 2-(3-t-butyl-2-hydroxy-5-methylphenyl)-5-chlorobenzotriazole, and 2,4-di-t-butylphenyl 3,5-di-t-butyl-4-hydroxybenzoate;

a filler such as calcium carbonate, silicate, glass fiber, talc, kaolin, mica, barium sulfate, carbon black, carbon fiber, zeolite, a metal powder, and a metal oxide;

the following antistatic agents:

an antistatic agent such as a quaternary ammonium salt type cationic surfactant, a betaine type amphoteric surfactant, an alkyl phosphate type anionic surfactant, and a cationic surfactant such as a primary amine salt, a secondary amine salt, a tertiary amine salt, a quaternary amine salt, or a pyridine derivative;

an anionic surfactant such as sulfated oil, soap, sulfated ester oil, sulfated amide oil, olefin sulfated ester salts, fatty alcohol sulfate ester salts, alkyl sulfate ester salts, fatty acid ethylsulfonate salts, alkylnaphthalenesulfonate salts, alkylbenzenesulfonate salts, succinate ester sulfonate salts, and phosphate ester salts;

a nonionic antistatic agent such as a partial fatty acid ester of a polyhydric alcohol, an ethylene oxide adduct of a fatty alcohol, an ethylene oxide adduct of a fatty acid, an ethylene oxide adduct of a fatty amine or a fatty acid amide, an ethylene oxide adduct of an alkylphenol, an ethylene oxide adduct of a partial fatty acid ester of a polyhydric alcohol, and polyethylene glycol; and an amphoteric antistatic agent such as a carboxylic acid derivative or an imidazoline derivative, or among these, an antistatic agent having a melting point exceeding 70° C.;

an inorganic anti-blocking agent such as aluminum silicate, synthetic silica, natural silica, zeolite, kaolin, and diatomaceous earth or an organic anti-blocking agent such as cross-linked polymethyl methacrylate;

a pigment such as carbon black, titanium oxide, a phthalocyanine-based pigment, a quinacridone-based pigment, an isoindolinone-based pigment, a perylene- or perynine-based pigment, a quinophthalone-based pigment, a diketopyrrolopyrrole-based pigment, a dioxazine-based pigment, disazo fused pigment, and a benzimidazolone-based pigment;

a flame-retardant such as decabromobiphenyl, antimony trioxide, a phosphate-based flame-retardant, aluminum hydroxide; and a phenol-based antioxidant other than the compound (1) such as 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl)benzene, tris(3,5-di-t-butyl-4-hydroxybenzyl)isocyanurate, 1,3,5-tris (4-t-butyl-3-hydroxy-2,6-dimethylbenzyl)-1,3,5-triazine-2, 4,6-(1H,3H,5H)-trione, 2,2'-methylenebis(6-t-butyl-4-methylphenol), 4,4'-butylidenebis(6-t-butyl-3-methylphenol), 4,4'-thiobis(6-t-butyl-3-methylphenol).

The particulate composition (A) is usually prepared by being granulated in the temperature range from the softening point to the melting point of the binder. As specific examples, a method in which a mixture containing the compound (1), the metal soap, and the binder is stirred and granulated in the temperature range from the softening point to the melting point of the binder, a method in which a part or the entirety of a mixture containing the compound (1) and the metal soap is extruded and formed at a temperature equal to the softening point or higher, and then granulated (so-called melt extrusion), a method in which a part or the entirety of a mixture containing the compound (1) and the metal soap is extruded and formed at a temperature less than the softening point, and then granulated (so-called dry extrusion), and a method in which a mixture containing the compound (1) and the metal soap is compressed and formed by a roller or tableting machine, and then granulated.

Among these, the stirring-granulation method is preferable since heating temperature of the particulate composition (A) becomes lowered and thus there is a tendency that heat deterioration of the compound (1) is reduced.

In particular, it is preferable when the binder is the sulfur-based compound (2) since granulation can be carried out at a lower temperature range from 40 to 70° C., and preferably 45 to 55° C. as the temperature range from the softening point to the melting point.

The softening point referred thereto is a value measured in accordance with JIS K2425.

The stirring-granulation method is usually carried out using a stirring granulator. As the method for giving heat in the stirring granulator, a method of setting the temperature by utilizing heat production resulting from a shear force when a mixture containing the compound (1) and the metal soap in a stirring granulator are stirred, a method of raising the temperature by passing a heating medium through a jacket or the like of a stirring granulator, and a method combining these methods can be given as examples.

Examples of the method of charging an additive and the like into a stirring granulator include a method of charging together the compound (1), the metal soap, the sulfur-based compound (2), and, if necessary, another additive or additives, followed by stirring-granulation; a method of charging together the compound (1), the metal soap, and, if necessary, another additive or additives, raising the temperature to a desired temperature after stirring, charging the sulfur-based compound (2), and stirring-granulating the mixture; and a method of similarly raising the temperature to a desired temperature while the mixture is stirred, spraying the sulfur-based compound (2), which has been warmed to liquid, followed by stirring-granulation.

The stirring granulator used in the present invention is an internal stirring type granulator usually having a stirring blade in the interior thereof, and having a clearance between the tip of the stirring blade and the wall surface in the interior of a stirring granulator of usually 30 mm or less, and preferably around 0.1 to 5 mm (about 1 mm in Examples).

As the stirring granulator, a vertical-type mixer such as a high speed mixer (stirring rolling granulator), a Henschel mixer (high speed stirring granulator), a vertical granulator, Pharma-Matrix, a supermixer, a gral, a Schugi mixer, a high speeder, and a new speed kneader, and a horizontal-type mixer such as a LODIGE mixer, a spartan granulator, and a pin mixer can be given as examples. The stirring granulator may be provided with a stirring blade called a chopper which is used for grinding and particle diameter adjustment of a coarse granulated particle, unlike a stirring blade for granulation.

The stirring blade of the high speed mixer used in Examples will be explained in more detail. The cross-section of the stirring blade is inclined from the bottom at an angle of 10 to 50° (in the Examples, 30 to 45° for the central part, and 20 to 25° for the tip), and a mixture containing the compound (1) and the produced granules are scooped up from a bottom.

The shape of the blade end contacting with the wall surface in the interior of a stirring granulator may be arbitrarily designed. In the case of the high speed mixer used in the Examples, there is inclination toward the central part and the mixture is scooped up to the central part so that the mixture does not reside on the corner between the bottom and the wall surface.

Although the stirring speed is different depending on a shape of the selected stirring blade, the blade tip rate is usually around 2 to 40 m/s, and preferably 4 to 20 m/s. It is preferable when the blade tip speed is 40 m/s or less since there is a tendency that grinding of the produced granules with the stirring blade is suppressed. It is preferable when the rate is 2 m/s or more since there is a tendency that flowability of the resulting granules is improved.

When mixed with a stirring granulator, from the viewpoint of suppressing deterioration of an additive, it is preferable to conduct the mixing under an inert gas atmosphere such as nitrogen.

After completion of mixing, from the viewpoint of suppressing deterioration of an additive, it is preferable to cool the mixture lower than the granulating temperature, and more preferably to a temperature less than 40° C., by passing cold air, or storing the granules in a refrigerator.

Also, in order to stabilize the quality of the obtained particulate composition (A), large granules (for example, 5 mm or more, and preferably 3 mm or more) or small granules (for example, 0.1 mm or less, preferably 0.3 mm or less, and more preferably 0.5 mm or less) may be removed with a sieve.

The particulate composition (A) thus obtained is the granule aggregate mentioned above, and the particulate composition (A) has an average particle diameter of 0.1 to 5 mm. Also, a particulate composition (A) having a dust flying rate in a Heubach test of 1% by weight or less is also preferred from the viewpoint of the working environment since it has a small amount of dust flying when handled. In particular, a particulate composition (A) comprising granules having an average particle diameter of 0.1 to 2 mm has better dispersity when added to a polyolefin.

Adjustment of the particle diameter can be carried out by adjusting the stirring speed of the stirring blade, the stirring speed of the chopper, the stirring time, and the heating temperature. Specifically, in order to increase the particle diameter, the stirring speed may be made faster and/or the chopper speed may be made slower. Even with the same stirring speed, the particle diameter can be made larger by increasing the stirring time. Also, even with the same stirring time, the particle diameter can be made larger by increasing the heating temperature.

The polyolefin used in the particulate polyolefin composition (B) used in the present invention is a polymer with carbon-carbon bondings containing a structural unit derived from ethylene and/or α-olefin as a main chain.

Examples of such polyolefin include a polypropylene; a polyethylene such as high density polyethylene (HD-PE), low density polyethylene (LD-PE), and linear low density polyethylene (LLDPE); a methylpentene polymer; an ethylene/ethyl acrylate copolymer resin; an ethylene/vinyl acrylate copolymer resin; polystyrene such as poly(p-methylstyrene) and poly(α-methylstyrene); an acrylonitrile/styrene copolymer resin; an acrylonitrile/butadiene/styrene copolymer resin; a special acrylic rubber/acrylonitrile/styrene copolymer resin; an acrylonitrile/chlorinated polyethylene/styrene copolymer resin; chlorinated polyethylene; polychloroprene; chlorinated rubber; polyvinyl chloride; polyvinylidene chloride; a methacrylic resin; an ethylene/vinyl alcohol copolymer resin; a fluororesin; polyacetal; a grafted polyphenylene ether resin; a polyphenylene sulfide resin; polyurethane; polyamide; a polyester resin such as polyethylene terephthalate and polybutylene terephthalate; polycarbonate; polyacrylate; polysulfone; polyether ether ketone; polyether sulfone; an aromatic polyester resin; a diallyphthalateprepolymer; a silicone resin; 1,2-polybutadiene, polyisoprene, a styrene/butadiene copolymer; a butadiene/acrylonitrile copolymer, an ethylene/propylene copolymer; and an ethylene/methacrylate copolymer. Among these, a polypropylene-based resin is preferable from the viewpoint of moldability.

When a polypropylene-based resin is used as the polyolefin, a crystalline propropylene homopolymer; a propyleneethylene random copolymer; a propylene-α-olefin random copolymer; a propylene-ethylene-α-olefin copolymer; and a polypropylene block copolymer made of a propylene homopolymer component or copolymer components mainly comprising propylene and copolymer components of propylene, ethylene, and/or α-olefin can be given as specific examples. These polypropylenes can be used alone or by blending two or more thereof.

The α-olefin other than polypropylene in the polypropylene-based resin is a $C_4$ to $C_{12}$ α-olefin and preferable examples thereof include 1-butene, 1-pentene, 1-hexene, 4-methyl-1-pentene, 1-octene and 1-decene. 1-butene, 1-hexene, or 1-octene is more preferable.

As the propylene-α-olefin copolymer, a propylene-1-butene copolymer, a propylene-1-hexene copolymer, and a propylene-1-octene copolymer can be given as examples.

As the propylene-ethylene-α-olefin random copolymer, a propylene-ethylene-1-butene random copolymer, a propylene-ethylene-1-hexene random copolymer, and a propylene-ethylene-1-octene random copolymer can be given as examples.

As the copolymer component mainly comprising propylene in the polypropylene copolymer comprising a propylene homopolymer component or copolymer components mainly comprising propylene and copolymer components of propylene, ethylene, and/or α-olefin, a propylene-ethylene copolymer component, a propylene-1-butene copolymer component, and a propylene-1-hexene copolymer component can be given as examples. Examples of the copolymer component of propylene, ethylene, and/or α-olefin include a propyleneethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene-1-octene copolymer component. The content of the ethylene and/or a $C_4$ to $C_{12}$ α-olefin in the copolymer component of propylene, ethylene, and/or α-olefin is usually 0.01 to 20% by weight although there are no particular limitations thereon.

As the polypropylene block copolymer made of a propylene homopolymer component or copolymer components mainly comprising propylene and copolymer components of propylene, ethylene, and/or α-olefin, a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, and a (propylene-1-butene)-(propylene-1-hexene) block copolymer can be given as examples.

When a polypropylene-based resin is used as the particulate polyolefin (B), a crystalline propylene homopolymer or a polypropylene block copolymer made of a propylene homopolymer component or copolymer components mainly comprising propylene and copolymer components of propylene, ethylene, and/or $C_4$ to $C_{12}$ α-olefin are preferably used. More preferable is a polypropylene block copolymer made of a propylene homopolymer component or copolymer components mainly comprising propylene and copolymer components of propylene, ethylene, and/or $C_4$ to $C_{12}$ α-olefin.

The polypropylene-based resin preferably has a high crystallinity from the viewpoint of rigidity and scratch resistance. The preferable polypropylene-based resin with high crystallinity is that in which the fraction of the propylene monomer units existing at the centers of the chains in which five propylene monomer units are successively meso-bonded to the pentad units in the polypropylene molecule is 0.95 or more, the fraction being determined by the method reported by A. Zambelli et al. in Macromolecules, 6, 925 (1973). The fraction is called an pentad fraction and is represented by [mmmm].

The method for producing the particulate polyolefin (B) is not particularly restricted. The particulate polyolefin (B) can be produced by a known polymerization method using a known polymerization catalyst. Also, a commercially available particulate polyolefin (B) may be used.

When a polypropylene-based resin is used as the particulate polyolefin (B), examples of the polymerization catalyst used include a Ziegler type catalyst; a Ziegler-Natta type catalyst; a catalyst system comprising a compound of a transition metal of Group IV of the periodic table having a cyclopentadienyl ring, and an alkylaluminoxane; and a catalyst systems comprising a compound of a transition metal of Group IV of the periodic table having a cyclopentadienyl ring, a compound capable of reacting with this compound to form an ionic complex, and an organoaluminum compound.

When a polypropylene-based resin is used as the particulate polyolefin (B), examples of the polymerization method include a slurry polymerization method using an inert hydrocarbon solvent, a solvent polymerization method, a liquid phase polymerization method using no solvent, a gas phase polymerization method, and a liquid phase-gas phase polymerization method in which these methods are performed successively. These polymerization methods may be in a batch mode or in a continuous mode. The polymerization method may be a method in which the polypropylene-based resin is produced in one stage or may be a method in which it is produced in multiple (two or more) stages. In particular, as the method for producing a polypropylene block copolymer comprising a propylene homopolymer component or copolymer components mainly comprising propylene and a copolymer component of propylene, ethylene, and/or a $C_4$ to $C_{12}$ α-olefin, a production method comprising multiple (two or more) stages comprising a stage of producing the propylene homopolymer component or the copolymer components mainly comprising propylene and a stage of producing the copolymer component of propylene, ethylene, and/or a $C_4$ to $C_{12}$ α-olefin can be given as a preferable example.

The melt index (MI) of the particulate polyolefin (B) is preferably within the range from 0.01 to 100 g/10 minutes, in the case of a polypropylene-based resin for example, from the viewpoints of moldability and the like although there are no particular limitations thereon.

The average particle diameter of the particulate polyolefin (B) is usually 10 to 2,000 μm, and preferably 100 to 1,500 μm. It is preferable when the average particle diameter is 10 μm or more since there is a tendency that the raw material is easily charged from the charging slot. It is preferable when the average particle diameter is 2,000 μm or less since there is a tendency that dust produced when charging the raw materials and spouting at the time of mixing the raw material can be suppressed. It is thus preferable when the particle diameter is in the above-mentioned ranges since mixing and molding is easier in the case where a horizontal twin screw extruder is used.

The present invention relates to a method for preparing a polyolefin composition, which comprises melt-kneading the particulate composition (A) and the particulate polyolefin (B) in which the ratio (a/b) of the average particle diameter (a) of the particulate composition (A) and the average particle diameter (b) of the particulate polyolefin (B) used is from 3/1 to 1/3, preferably from 2/1 to 1/2, and particularly preferably from 1/1 to 1/2.

As the method for adjusting the above-mentioned particle diameter ratio, a method in which the particulate polyolefin (B) is pulverized, a method in which the particulate composition (A) obtained by extrusion molding or the like is pulverized and a method in which the particulate composition (A) is prepared by the stirring-granulation method can be given as examples. Among these, when the particulate composition (A) is prepared by the stirring-granulation method, a particulate composition (A) in which there is no production of a powder which produces dust and which has a preferable particle diameter ratio with the particulate polyolefin (B) can be easily obtained.

The melt-kneading is usually a method in which the particulate composition (A) and the particulate polyolefin (B) are kneaded with heat using an extrusion kneader. Among these, an extrusion kneader provided with multiple screws such as two screws or with a single screw is preferably used since temperature control thereof can be easily conducted. In particular, a multiple screw extrusion granulator is preferred since it tends to give excellent dispersion of the compound (1), the metal soap, other additive or additives, and the like in the particulate composition (A). When an extrusion kneader is used, the polyolefin composition can be preferably prepared by setting a temperature in the temperature range from the softening point of the polyolefin to a temperature 20 degrees less than this softening point in the heat-mixing part such as the part provided with the screw or screws.

Also, since there is a tendency for production safety to improve it is preferable to set the temperature which gradually increases from the charging slot and to set the temperatures of the adapter part and the die part to the same temperature as or a little higher than the heating-mixing part.

EXAMPLES

The present invention will be further described in detail by way of examples. The present invention is not limited to the following examples.

Production Example

Production of Particulate Composition (A)

43 g of 3,9-bis[2-{3-(3-t-butyl-4-hydroxy-5-methylphenyl)propionyloxy}-1,1-dimethylethyl]-2,4,8,10-tetraoxaspiro[55]undecane (tradename: Sumilizer GA-80, manufactured by Sumitomo Chemical Co., Ltd.) as a phenol-based antioxidant, 86 g of tris(2,4-di-t-butylphenyl)phosphite (tradename: Irgafos 168, manufactured by Ciba Specialty Chemicals), 86 g of 3,3'-thiodipropionic acid di-n-tetradecyl ester (tradename: Sumilizer TPM, manufactured by Sumitomo Chemical Co., Ltd.), and 86 g of calcium stearate manufactured by Kyodo Chemical Co., Ltd. were charged into a high speed mixer (manufactured by Fukae Powtec Co., Ltd., volume: 2 L). After charging, the mixture was stirred with a stirring blade having a rotational speed of 500 rpm and a chopper having a rotational speed of 1,000 rpm to obtain a particulate composition (A) in the form of granules. This was classified by a sieve according to the method disclosed in JIS K 0069 and the weight-based average particle diameter distribution was determined. The central cumulative value (50% by weight size) obtained from this distribution was the average particle diameter and is shown in Table 1.

TABLE 1

| Particulate composition (A) | Average particle diameter (mm) |
|---|---|
| 1 | 0.75 |
| 2 | 1.35 |
| 3 | 2.25 |
| 4 | 3.90 |

Examples and Comparative Example

Performance Evaluation of Polypropylene 0.175 parts by weight of the particulate composition (A) obtained in the production example was dry blended with 100 parts by weight of a particulate propylene ((B), MFR =8, average particle diameter =0.75 mm) to obtain a mixture of the particulate composition (A) and the particulate polypropylene (B). This mixture was charged from a hopper and extruded using a 30 mmf single screw extruder (DH-30-180 manufactured by Tanabe Plastics Machinery Co., Ltd., LID: 28) at a temperature of 220° C. and a screw rotational speed of 50 rpm to obtain a pellet sample.

The obtained pellets were sampled four times and then after being retained 15 min. in a cylinder at 230° C. using a melt indexer (L217-E14011 manufactured by Technol Seven), the MFR was measured at a load of 2.16 kg. The results are shown in Table 2. The smaller the MFR value means excellent heat stability. Also, the smaller the deviation of MFR values measured for the four samplings means that variation in the MFR value is small, that dispersity of the particulate composition (A) in the polypropylene (B) is good, and that a polypropylene composition having heat stability can be obtained.

TABLE 2

|  | (A) | Ratio of particle diameter (a)/(b) | N = 1 | N = 2 | N = 3 | N = 4 | Average | Standard deviation |
|---|---|---|---|---|---|---|---|---|
| Example 1 | 1 | 1.0 | 11.6 | 11.5 | 11.5 | 11.5 | 11.5 | 0.05 |
| Example 2 | 2 | 1.8 | 12.0 | 12.0 | 12.2 | 12.2 | 12.1 | 0.12 |
| Example 3 | 3 | 3.0 | 12.2 | 12.2 | 12.4 | 12.1 | 12.2 | 0.13 |
| Comparative Example 1 | 4 | 5.2 | 12.3 | 12.5 | 12.0 | 11.8 | 12.1 | 0.31 |

According to the method of the present invention, dispersity of a granular additive or additives in a polyolefin is good and a polyolefin resin composition having excellent heat stability can be obtained. This can be processed into products such as films, molding materials, pipes, and the like and used.

The major embodiments and the preferred embodiments of the present invention are listed below.

[1] A method for producing a polyolefin composition, which comprises melt-kneading a particulate composition (A) containing a compound represented by formula (1):

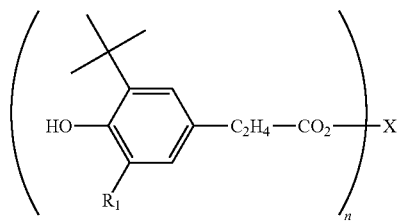

wherein $R_1$ represents an alkyl group having 1 to 8 carbon atoms, X represents an n-hydric alcohol residue having 1 to 18 carbon atoms which may include a heteroatom and/or a cyclic group, and n is the integer 2 or 4, and a metal soap, and a particulate polyolefin (B), wherein the ratio (a/b) of the average particle diameter (a) of the particulate composition (A) and the an average particle diameter (b) of the particulate polyolefin (B) is adjusted to 3/1 to 1/3, and wherein average particle diameter means the central cumulative value determined from a weight-based particle diameter cumulative distribution for residue on a sieve measured in accordance with JIS K 0069.

[2] The method according to [1], wherein the particulate composition (A) further contains a binder and the composition forms particles in a temperature range from a softening point to a melting point of the binder.

[3] The method according to [2], wherein the binder is a sulfur-based compound represented by formula (2):

wherein $R_2$ represents an alkyl group having 12 to 18 carbon atoms, Y represents a single bond or a —$C_2H_4CO_2$— group, m represents an integer from 1 to 4, and Z represents an m-hydric alcohol residue having 5 to 18 carbon atoms.

[4] The method according to any one of [1] to [3], wherein the metal soap is calcium stearate and/or calcium palmitate.

[5] The method according to any one of claims [1] to [4], wherein the average particle diameter of the particulate composition (A) is 0.1 to 5 mm.

[6] The method according to any one of [1] to [5], wherein the particulate polyolefin (B) is a polypropylene-based resin.

The present application has been filed claiming the Paris Convention priority based on the Japanese patent application No. 2007-118641 (filed on Apr. 27, 2007), the entire content of which is herein incorporated by reference.

What is claimed is:

1. A method for producing a polyolefin composition, which comprises melt-kneading a particulate composition (A) containing a compound represented by formula (1):

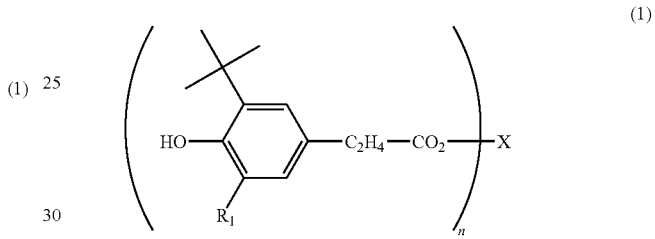

wherein $R_1$ represents an alkyl group having 1 to 8 carbon atoms, X represents an n-hydric alcohol residue having 1 to 18 carbon atoms and includes a heteroatom and/or a cyclic group, and n is the integer 2 or 4, and a metal soap, and a particulate polyolefin (B), wherein the ratio (a/b) of the average particle diameter (a) of the particulate composition (A) and an average particle diameter (b) of the particulate polyolefin (B) is adjusted to 3/1 to 1/3, and wherein average particle diameter means the central cumulative value determined from a weight-based particle diameter cumulative distribution for residue on a sieve measured in accordance with JIS K 0069.

2. The method according to claim 1, wherein the particulate composition (A) further contains a binder and the composition forms particles in a temperature range from a softening point to a melting point of the binder.

3. The method according to claim 2, wherein the binder is a sulfur-based compound represented by formula (2):

wherein $R_2$ represents an alkyl group having 12 to 18 carbon atoms, Y represents a single bond or a —$C_2H_4CO_2$— group, m represents an integer from 1 to 4, and Z represents an m-hydric alcohol residue having 5 to 18 carbon atoms.

4. The method according to any one of claims 1 to 3, wherein the metal soap is calcium stearate and/or calcium palmitate.

5. The method according to any one of claims 1 to 3, wherein the average particle diameter of the particulate composition (A) is 0.1 to 5 mm.

6. The method according to any one of claims 1 to 3, wherein the particulate polyolefin (B) is a polypropylene-based resin.

* * * * *